United States Patent
Teranishi et al.

(10) Patent No.: US 10,562,727 B2
(45) Date of Patent: Feb. 18, 2020

(54) GLASS ROLL AND METHOD OF PROCESSING GLASS ROLL

(71) Applicant: Nippon Electric Glass Co., Ltd., Shiga (JP)

(72) Inventors: Yasuo Teranishi, Shiga (JP); Kaoru Mitsugi, Shiga (JP); Yoshinori Hasegawa, Shiga (JP); Michiharu Eta, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 1129 days.

(21) Appl. No.: 14/870,623

(22) Filed: Sep. 30, 2015

(65) Prior Publication Data

US 2016/0016746 A1  Jan. 21, 2016

Related U.S. Application Data

(62) Division of application No. 13/121,499, filed as application No. PCT/JP2009/067002 on Sep. 30, 2009, now abandoned.

(30) Foreign Application Priority Data

Oct. 1, 2008   (JP) ................................. 2008-256509
Oct. 28, 2008  (JP) ................................. 2008-277121
Sep. 18, 2009  (JP) ................................. 2009-217055

(51) Int. Cl.
  *B65H 20/00*   (2006.01)
  *B65H 16/00*   (2006.01)
  (Continued)

(52) U.S. Cl.
  CPC ........... *B65H 20/00* (2013.01); *B32B 17/064* (2013.01); *B65H 16/00* (2013.01); *B65H 18/00* (2013.01);
  (Continued)

(58) Field of Classification Search
  CPC ........ B65H 20/00; B65H 16/00; B65H 18/00; B65H 2301/414; B32B 17/064
  (Continued)

(56) References Cited

U.S. PATENT DOCUMENTS 1,655,297 A * 1/1928 Thornton ................. G03B 1/42
                                                  242/332.4
3,685,644 A   8/1972 Cothran et al.
(Continued)

FOREIGN PATENT DOCUMENTS

CA  2 359 366   7/2000
EP  0 716 339   6/1996
(Continued)

OTHER PUBLICATIONS

Japanese Office Action dated Nov. 2, 2015 issued in corresponding Japanese Patent Application No. 2014-137078, (with partial English translation).

(Continued)

*Primary Examiner* — Michael R Mansen
*Assistant Examiner* — Mark K Buse
(74) *Attorney, Agent, or Firm* — Wenderoth, Lind & Ponack, L.L.P.

(57) ABSTRACT

A roll-to-roll apparatus reliably reduces breakage of a glass film even in a case of sequentially performing predetermined processing on the glass film. Provided is a glass roll (1) formed by winding a glass film (2) into a roll, in which a resin film (4) is attached onto the glass film (2), and at least a part of the resin film (4) is arranged on a front side of an unwinding direction relative to a leading end portion in the unwinding direction of the glass film (2).

5 Claims, 4 Drawing Sheets

(51) Int. Cl.
  B65H 18/00 (2006.01)
  C03B 17/06 (2006.01)
  B32B 17/06 (2006.01)

(52) U.S. Cl.
  CPC ........ *C03B 17/06* (2013.01); *B65H 2301/414* (2013.01); *B65H 2301/41427* (2013.01)

(58) Field of Classification Search
  USPC .................................................... 242/332.4
  See application file for complete search history.

(56) References Cited

U.S. PATENT DOCUMENTS

| | | | | |
|---|---|---|---|---|
| 4,235,951 | A * | 11/1980 | Swarovski | B32B 17/10174 428/40.4 |
| 4,322,276 | A * | 3/1982 | Meckel | C03C 17/002 204/192.26 |
| 4,485,125 | A | 11/1984 | Izu et al. | |
| 4,681,218 | A | 7/1987 | Williams | |
| 5,655,659 | A * | 8/1997 | Kennedy | G03C 3/00 206/455 |
| 6,079,654 | A * | 6/2000 | Sasou | G03B 17/26 242/332.4 |
| 6,350,489 | B1 * | 2/2002 | Moriyama | C23C 16/545 427/255.5 |
| 6,360,979 | B1 * | 3/2002 | Larson | G03B 1/58 242/332.4 |
| 6,439,489 | B1 * | 8/2002 | Hoge | G11B 15/67 242/332.4 |
| 6,502,423 | B1 * | 1/2003 | Ostendarp | C03B 17/06 65/100 |
| 6,815,070 | B1 * | 11/2004 | Burkle | B32B 3/04 427/165 |
| 7,059,154 | B1 | 6/2006 | Quentin et al. | |
| 2007/0275338 | A1 | 11/2007 | Acker et al. | |
| 2009/0088515 | A1 | 4/2009 | Yagyu et al. | |
| 2010/0065518 | A1 | 3/2010 | Noda et al. | |
| 2010/0276066 | A1 | 11/2010 | Kondo | |
| 2011/0177290 | A1 | 7/2011 | Tomamoto et al. | |
| 2011/0177325 | A1 | 7/2011 | Tomamoto et al. | |
| 2011/0192878 | A1 * | 8/2011 | Teranishi | C03B 17/06 226/1 |
| 2011/0200812 | A1 | 8/2011 | Tomamoto et al. | |
| 2011/0217521 | A1 * | 9/2011 | Teranishi | B32B 3/02 428/189 |
| 2012/0015132 | A1 * | 1/2012 | Hasegawa | B65H 21/00 428/61 |
| 2012/0024929 | A1 * | 2/2012 | Teranishi | C03B 35/14 226/1 |
| 2012/0156439 | A1 * | 6/2012 | Mori | B32B 3/02 428/189 |
| 2012/0237779 | A1 * | 9/2012 | Teranishi | B65D 85/672 428/426 |
| 2013/0129987 | A1 * | 5/2013 | Mitsugi | C03B 35/163 428/189 |
| 2014/0319001 | A1 | 10/2014 | Tomamoto et al. | |
| 2015/0269963 | A1 * | 9/2015 | Erpelding | G11B 15/67 242/332.4 |
| 2016/0016746 | A1 * | 1/2016 | Teranishi | C03B 17/06 242/532.1 |
| 2017/0087599 | A1 * | 3/2017 | Akiyama | B08B 1/04 |

FOREIGN PATENT DOCUMENTS

| | | |
|---|---|---|
| EP | 0 782 176 | 7/1997 |
| EP | 0 808 722 | 11/1997 |
| EP | 2 236 281 | 10/2010 |
| EP | 2 332 856 | 6/2011 |
| EP | 2 336 050 | 6/2011 |
| EP | 2 343 248 | 7/2011 |
| GB | 503557 | 4/1939 |
| JP | 48-18360 | 6/1973 |
| JP | 58-203867 | 11/1983 |
| JP | 62-193238 | 12/1987 |
| JP | 1-500990 | 4/1989 |
| JP | 2-1503 | 1/1990 |
| JP | 2-48577 | 4/1990 |
| JP | 02-310239 | 12/1990 |
| JP | 03-128847 | 5/1991 |
| JP | 05-330178 | 12/1993 |
| JP | 08-283041 | 10/1996 |
| JP | 10-338548 | 12/1998 |
| JP | 11-043180 | 2/1999 |
| JP | 2001-97733 | 4/2001 |
| JP | 2001-318219 | 11/2001 |
| JP | 2002-534305 | 10/2002 |
| JP | 2002-544104 | 12/2002 |
| JP | 2005-144858 | 6/2005 |
| JP | 2005-225925 | 8/2005 |
| JP | 2005-239242 | 9/2005 |
| JP | 2005-255225 | 9/2005 |
| JP | 2006-184741 | 7/2006 |
| JP | 2006-264786 | 10/2006 |
| JP | 2006-347783 | 12/2006 |
| JP | 2007-039092 | 2/2007 |
| JP | 2007-106418 | 4/2007 |
| JP | 2007-119322 | 5/2007 |
| JP | 2007-269391 | 10/2007 |
| JP | 2008-133174 | 6/2008 |
| JP | 2008-209906 | 9/2008 |
| TW | 200516502 | 5/2005 |
| TW | M298580 | 10/2006 |
| TW | 200831371 | 8/2008 |
| WO | 87/06626 | 11/1987 |
| WO | 00/68156 | 11/2000 |
| WO | 2007/111221 | 10/2007 |
| WO | 2008/050605 | 5/2008 |
| WO | 2008/123124 | 10/2008 |

OTHER PUBLICATIONS

Japanese Office Action dated Nov. 2, 2015 issued in corresponding Japanese Patent Application No. 2014-156486.
International Search Report dated Nov. 24, 2009 in International (PCT) Application No. PCT/JP2009/067002.
International Preliminary Report on Patentability and Written Opinion of the International Searching Authority dated May 19, 2011 in International (PCT) Application No. PCT/JP2009/067002.
Supplementary European Search Report dated Jul. 27, 2012 in European Patent Application No. 09817792.6.
Supplementary European Search Report dated Oct. 26, 2012 in corresponding European Application No. 09817791.8.
Extended European Search Report (in English language) dated Mar. 4, 2013 in corresponding European patent application No. 09817789.2.
Extended European Search Report (in English language) dated Mar. 13, 2013 in corresponding European patent application No. 09817790.0.
Extended European Search Report (in English language) dated Mar. 26, 2013 in corresponding European patent application No. 09817793.4.
Japanese Office Action dated Jul. 2, 2013 in corresponding Japanese Application No. 2009-207431 (partial English translation).
Japanese Office Action dated Jul. 2, 2013 in corresponding Japanese Application No. 2009-214858 (partial English translation).
Japanese Office Action dated Jul. 2, 2013 in corresponding Japanese Application No. 2009-214860 (partial English translation).
Machine Translation of JP 05-330178 via JPO, Inventor Watanabe Yasuo, date of filing Jun. 2, 1992.
Taiwanese Office Action dated Feb. 17, 2016 in corresponding Taiwanese Patent Application No. 103133513 (partial English translation).
Taiwanese Office Action dated Feb. 17, 2016 in corresponding Taiwanese Patent Application No. 103133514 (partial English translation).
Taiwanese Office Action dated Feb. 17, 2016 in corresponding Taiwanese Patent Application No. 103133515 (partial English translation).

(56) References Cited

OTHER PUBLICATIONS

Office Action dated Sep. 20, 2017 in Japanese Patent Application No. 2014-156486, with English-language translation.
Office Action dated Aug. 9, 2016 in corresponding European Application No. 09 817 790.0.

* cited by examiner

GLASS ROLL AND METHOD OF PROCESSING GLASS ROLL

TECHNICAL FIELD

The present invention relates to a package form for a glass film which is used as a glass substrate for a flat panel display and a solar cell, and used as cover glass or the like for an organic light-emitting diode (OLED) lighting, and to a processing method for the glass film.

BACKGROUND ART

As is well known in the art, in recent years, there is a demand for further thinning of various glass plates including glass substrates for a flat panel display, such as a liquid crystal display, a plasma display, an organic light-emitting diode (OLED) display, or a field emission display. Therefore, along with the demand, a so-called glass film that is thinned into a film is being developed. For example, as disclosed in Patent Literature 1, a glass film having a thickness of 200 μm or less has been developed.

Further, for example, as disclosed in Patent Literature 2, as a package form for the glass film, there is adopted a glass roll formed by winding the glass film into a roll. The package form utilizes a characteristic that the glass film has sufficient flexibility due to its thinness, and has an advantage that it is possible to save a space occupied by the packaged glass film.

In addition, for example, as disclosed in Patent Literature 3, the glass roll is supplied while being unwound, a functional film is formed on a surface of the glass film, and then the glass film having the surface on which the functional film is formed is wound again. Thus, the functional film is formed on the glass film using a so-called roll-to-roll method. In this way, only by unwinding the glass film from the glass roll successively, film forming processing can be performed on the glass film sequentially, which is convenient.

CITATION LIST

Patent Literature

Patent Literature 1: JP 2008-133174 A
Patent Literature 2: JP 2002-544104 A
Patent Literature 3: JP 2007-119322 A

SUMMARY OF INVENTION

Technical Problem

By the way, as disclosed in Patent Literature 3, an apparatus for carrying out the roll-to-roll method (hereinafter, referred to as roll-to-roll apparatus) includes an unwinding section and a winding section, and performs predetermined processing such as the film forming on the glass film between the unwinding section and the winding section while successively supplying the glass film from the unwinding section to the winding section. Therefore, in a case where the roll-to-roll apparatus performs the predetermined processing on the glass film, first, it is necessary to guide, into the winding section, the glass film that is unwound from the glass roll set in the unwinding section, and to set the glass film between the unwinding section and the winding section.

However, when guiding the glass film first from the unwinding section to the winding section, a posture of a leading end portion of the glass film is liable to be unstable. Thus, the leading end portion of the glass film is excessively and repeatedly brought into contact with/impact on apparatus components, which may sometimes lead to such a situation that small flaws are formed in a vicinity of the leading end portion. This situation may cause a problem in that the vicinity of the leading end portion of the glass film breaks due to the small flaws.

Further, when the vicinity of the leading end portion of the glass film breaks, the glass film is cut halfway through the processing due to the breakage in some cases. In this case, intended tension does not act on the glass film in the roll-to-roll apparatus, and hence a bend and a flutter occur also in an intermediate portion or the like in a longitudinal direction of the glass film. As a result, a portion of the glass film other than the leading end portion thereof is also brought into unnecessary contact with the apparatus components, which may lead to a major problem such as escalation of breakage of the glass film.

In view of the above-mentioned circumstances, it is a technical object of the present invention to reliably reduce breakage of the glass film even when performing the predetermined processing on the glass film by the roll-to-roll apparatus.

Solution to Problems

The present invention, which has been made to solve the above-mentioned problems, provides a glass roll, which is formed by winding a glass film into a roll, in which a resin film is attached onto the glass film, and at least a part of the resin film is arranged on a front side of an unwinding direction relative to a leading end portion in the unwinding direction of the glass film.

With this configuration, when guiding the glass film first from an unwinding section to a winding section of a roll-to-roll apparatus, it is possible to perform the guiding operation while the resin film having higher fracture toughness in comparison with the glass film is in the lead. Further, the glass film is guided into the roll-to-roll apparatus after the resin film by being dragged by the resin film, and hence the glass film is less likely to be excessively brought into contact with/impact on apparatus components. Therefore, it is possible to reliably reduce such a situation that the glass film breaks at the time of the guiding operation.

In the above-mentioned configuration, the resin film may be coupled to the leading end portion in the unwinding direction of the glass film.

With this configuration, it is possible to easily and reliably position the resin film on the front side of the unwinding direction relative to the leading end portion in the unwinding direction of the glass film.

In this case, it is preferred that the resin film be coupled also to a trailing end portion in the unwinding direction of the glass film, and at least a part of the resin film be arranged on a rear side of the unwinding direction relative to the trailing end portion in the unwinding direction of the glass film.

The roll-to-roll apparatus needs to keep constant tension between the unwinding section and the winding section. When the resin film is coupled to the trailing end portion in the unwinding direction of the glass film, the constant tension can act on the glass film through the resin film even after the trailing end portion of the glass film is sent out of the unwinding section. Therefore, even after the trailing end portion of the glass film is sent out of the unwinding section, it is possible to stably perform predetermined processing on the glass film, which may contribute to effective use of the glass film.

Further, in a case where a plurality of roll-to-roll apparatus perform the processing, it is possible to obtain the following action and effect. That is, in this case, a portion that is treated as the trailing end portion in the processing of the previous roll-to-roll apparatus is wound last, and hence is treated as the leading end portion in the processing of the subsequent roll-to-roll apparatus. Therefore, when coupling the resin films respectively to the leading end portion and the trailing end portion of the glass film in this way, without rewinding the glass roll for every roll-to-roll apparatus so that a side on which the resin film is coupled serves as the leading end portion, the side on which the resin film is coupled can be always treated as the leading end portion, and hence efficient processing is possible.

In the above-mentioned configuration, it is preferred that the glass film and the resin film be coupled to each other with an elastic member.

When the glass film and the resin film are coupled to each other, in a case where the glass film and the resin film are supplied to the roll-to-roll apparatus under a state in which a widthwise center line of the glass film and a widthwise center line of the resin film are not present on the same straight line, the following problem may arise. That is, when displacement occurs between the widthwise center lines of the resin film and the glass film, the roll-to-roll apparatus forcibly corrects displacement of the glass film, and hence bending stress and torsional stress act on the portion of the glass film coupled to the resin film. Consequently, the glass film may break.

In view of this, in order to prevent the breakage, it is preferred that the glass film and the resin film be coupled to each other with the elastic member as described above. With this configuration, even if the widthwise center line of the glass film and the widthwise center line of the resin film are not present on the same straight line, the elastic member is deformed at the point in time when the tension acts on the glass film, to thereby absorb the displacement between the widthwise center line of the glass film and the widthwise center line of the resin film. Therefore, owing to the displacement absorbing effect exerted by the elastic member, the bending stress and torsional stress are less likely to be generated on the glass film, and hence it is possible to prevent breakage of the glass film. Note that, in a case where the resin film is coupled also to the trailing end portion in the unwinding direction of the glass film, it is preferred that the glass film and the resin film be coupled to each other with the elastic member at both of the leading end portion and the trailing end portion in the unwinding direction of the glass film.

In this case, it is preferred that the elastic member couple a region including a widthwise center line of the glass film and a widthwise center line of the resin film.

With this configuration, the elastic member couples the region including the widthwise center line of the glass film to the region including the widthwise center line of the resin film, and hence, even when an area of the portion coupled with the elastic member is reduced, it is possible to couple the films to each other in stable postures. Accordingly, owing to a reduction in area of the portion coupled with the elastic member, the stress can be reduced as much as possible, which acts on the glass film when the elastic member is deformed to absorb the displacement between the widthwise center line of the glass film and the widthwise center line of the resin film. Therefore, this is effective also in view of preventing breakage of the glass film.

In the above-mentioned configuration, it is preferred that the glass film and the resin film be coupled to each other under a state in which an end portion of the resin film is superposed on an end portion of the glass film.

With this configuration, an end surface of the glass film and an end surface of the resin film are out of direct contact with each other, and hence this is advantageous in view of preventing breakage of the glass film.

In the above-mentioned configuration, the resin film longer in length than the glass film may be superposed and attached onto one surface of the glass film, and the resin film may be extended beyond the leading end portion in the unwinding direction of the glass film.

With this configuration, while protecting the one surface of the glass film with the resin film, the roll-to-roll apparatus can perform the predetermined processing on another surface of the glass film.

In this case, it is preferred that the resin film be extended also beyond a trailing end portion side in the unwinding direction of the glass film.

With this configuration, the same resin film is extended beyond both the front and rear sides of the unwinding direction of the glass film. Thus, even after the trailing end portion of the glass film is sent out of the unwinding section of the roll-to-roll apparatus, the constant tension can act on the glass film through the resin film. Therefore, even after the trailing end portion of the glass film is sent out of the unwinding section, it is possible to stably perform the predetermined processing, and hence it is possible to achieve effective use of the glass film.

Further, in the case where the plurality of roll-to-roll apparatus perform the processing, it is possible to obtain the following action, and effect. That is, in this case, the portion that is treated as the trailing end portion in the processing of the previous roll-to-roll apparatus is wound last, and hence is treated as the leading end portion in the processing of the subsequent roll-to-roll apparatus. Therefore, when the resin film is extended beyond each of the leading end portion and the trailing end portion of the glass film in this way, without rewinding the glass roll for every roll-to-roll apparatus so that a side beyond which the resin film is extended serves as the leading end portion, the side beyond which the resin film is extended can be always treated as the leading end portion, and hence efficient processing is possible.

In the above-mentioned configuration, the glass film may include a plurality of glass films, and the plurality of glass films may be attached onto the same resin film.

With this configuration, the plurality of glass films with short lengths, which are previously cut into fixed lengths at user's request, etc., can be supplied to the roll-to-roll apparatus. Further, even the plurality of glass films with short lengths, which are cut due to a defect and the like at a stage of not having predetermined lengths, can be packaged in a state of the glass roll. As a result, the predetermined processing can be performed not only on the glass film with a long length but also on the glass film with a short length using the roll-to-roll apparatus.

In the above-mentioned configuration, the resin film may be superposed and attached onto the one surface of the glass film, and an another resin film separate from the resin film may be superposed and attached onto another surface of the glass film.

With this configuration, front and back surfaces of the glass film are protected with the resin films. Further, just before performing the predetermined processing by the roll-to-roll apparatus, by peeling off the resin film attached on a surface that is to be subjected to the processing, it is possible to carry out the processing without any problem.

The present invention, which has been made to solve the above-mentioned problems, provides a processing method for a glass roll, for sequentially performing, by a roll-to-roll apparatus, predetermined processing on a glass roll including a glass film wound into a roll, the processing method including: attaching a resin film onto the glass film; arranging at least a part of the resin film on a front side of an unwinding direction relative to a leading end portion in the unwinding direction of the glass film; and guiding the glass film into the roll-to-roll apparatus while the resin film is in the lead.

According to this method, it is possible to similarly obtain the above-mentioned action and effect.

In the above-mentioned method, it is preferred that a length of the resin film, which corresponds to a part on the front side of the unwinding direction relative to the leading end portion in the unwinding direction of the glass film, be equal to or larger than an entire length of a conveyance path for the glass film in the roll-to-roll apparatus.

With this configuration, only the resin film is present in an inside of the roll-to-roll apparatus at an early stage of operation, and hence if is possible to smoothly perform guiding operation into the inside of the roll-to-roll apparatus without paying any attention to the breakage of the glass film.

In the above-mentioned method, it is preferred that at least a part of the resin film be arranged also on a rear side of the unwinding direction relative to a trailing end portion in the unwinding direction of the glass film. Note that, the resin film described herein may be integrated with or separated from the resin film arranged on the front side of the unwinding direction relative to the leading end portion in the unwinding direction of the glass film.

With this configuration, it is possible to similarly obtain the above-mentioned action and effect.

In this case, it is preferred that a length of the resin film, which corresponds to a part on the rear side of the unwinding direction relative to the trailing end portion in the unwinding direction of the glass film, be equal to or larger than the entire length of the conveyance path for the glass film in the roll-to-roll apparatus.

With this configuration, tension can act on the glass film even at the point in time when the predetermined processing is performed on the trailing end portion in the unwinding direction of the glass film. Therefore, it is possible to perform stable processing over an entire length of the glass film.

Advantageous Effects of Invention

According to the present invention as described above, when guiding the glass film first from the unwinding section to the winding section of the roll-to-roll apparatus, it is possible to perform the guiding operation while the resin film attached on the glass film is in the lead. Therefore, the leading end portion, which is likely to be brought into contact with the apparatus components of the roll-to-roll apparatus, is formed of the resin film. Thus, at the time of the guiding operation, such a situation can be reduced as much as possible that the glass film is brought into contact with the apparatus components, to thereby break.

DESCRIPTION OF EMBODIMENTS

In the following, embodiments of the present invention are described with reference to the attached drawings.

Figure 1:
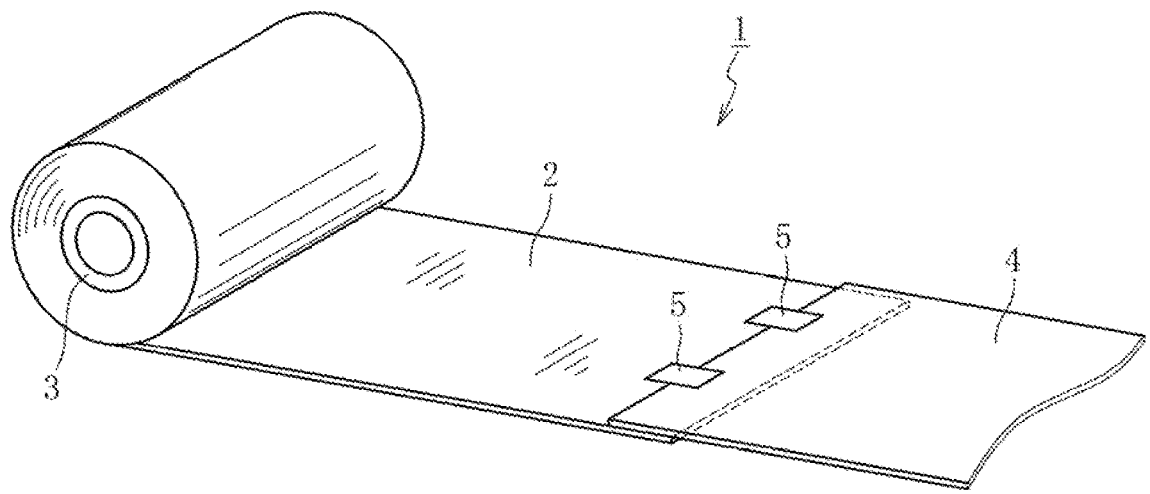
FIG. 1 A perspective view illustrating an entire configuration or a glass roll according to a first embodiment of the present invention.

FIG. 1 is a perspective view illustrating an entire configuration of a glass roll according to a first embodiment of the present invention. A glass roll 1 is formed by winding a glass film 2 onto an outer peripheral surface of a roll core 3 into a roll. A resin film 4 is coupled onto a leading end portion in a unwinding direction of the glass film 2, and a part of the resin film 4 protrudes from the leading end portion of the glass film 2 to a front side of the unwinding direction. Specifically, in this embodiment, the glass film 2 and the resin film 4 are coupled to each other in such a manner that adhesive tapes 5 are attached across the glass film 2 and the resin film 4 under a state in which an end portion of the glass film 2 and an end portion of the resin film 4 are superposed on each other.

The glass film 2 is formed by an overflow downdraw method to have a thickness of from 1 μm to 200 μm (preferably, 10 μm to 100 μm). The reason why the glass film is set to have such a thickness is because, with the thickness within the above-mentioned numerical range, appropriate flexibility and strength can be imparted to the glass film 2 and no trouble arises at the time of winding. In other words, when the thickness of the glass film 2 is less than 1 μm, handling of the glass film is troublesome because of lack of strength. When the thickness of the glass film 2 exceeds 200 μm, satisfactory flexibility is not obtained, which leads to a problem in that a winding radius is extremely and inevitably increased.

In this embodiment, a width of the glass film 2 is 12.5 mm or more, in particular, preferably 100 mm or more, more preferably 300 mm or more, and still more preferably 500 mm or more. Note that, the glass film 2 is used for a wide variety of devices including a small-screen display such as a mobile phone with a small size and a large-screen display such as a television set with a large size, and hence it is preferred that the width of the glass film 2 be finally selected as needed depending on a size of a substrate of a device to be used.

As a glass composition of the glass film 2, there can be used various glass compositions of silicate glass and the like, such as silica glass and borosilicate glass. However, if is preferred to use non-alkali glass. The reason is as follows. When the glass film 2 contains an alkali component, a phenomenon, so-called white weathering, occurs so that the glass film is structurally rough. When the glass film 2 is curved, there is a risk in that the glass film is prone to break from a portion that is weathered over time. Note that, herein, the non-alkali glass includes glass that does not substantially contain an alkali component, specifically, glass containing an alkali, metal oxide of 1000 ppm or less (preferably, of 500 ppm or less, and more preferably, of 300 ppm or less).

Further, in view of ensuring strength of the glass film 2, it is preferred that at least each end surface in a width direction of the glass film 2 include a cut surface which is cut by laser splitting. With this configuration, the each end surface in the width direction of the glass film 2 has a cross-section with high strength free from defects causing breakage, such as micro cracks. Specifically, when utilizing the laser splitting, without being subjected to polishing or the like after the cutting, the each end surface in the width direction of the glass film 2 is allowed to have an arithmetic average roughness Ra (compliant to JIS B0601:2001) of 0.1 μm or less (preferably, 0.05 μm or less). Here, the laser splitting refers to a method of cutting the glass film 2 in such a manner that an initial crack is caused to develop by utilizing thermal stress that is generated through expansion due to a heating action of laser and through contraction due to a cooling action of a refrigerant.

A thickness and a width of the resin film 4 are not particularly limited. However, considering that the resin film is caused to pass through in the same roll-to-roll apparatus as the glass film 2, it is preferred that the resin film have substantially the same thickness and width as those of the glass film 2. Specifically, it is preferred that the thickness of the resin film 4 be from 1 to 200 μm, and the width of the resin film 4 be 0.5 to 2 times (preferably 0.9 to 1.5 times) larger than the width of the glass film 2. Note that, the resin film 4 needs to have strength high enough to drag the glass film 2, and hence it is preferred to finally determine the thickness and the width in consideration of a material and the like of the resin film 4.

As the resin film 4, there cars be used, for example, an ionomer film, a polyethylene film, a polypropylene film, a polyvinyl chloride film, a polyvinylidene chloride film, a polyvinyl alcohol film, a polyester film, a polycarbonate film, a polystyrene film, a polyacrylonitrile film, an ethylene vinyl acetate copolymer film, an ethylene-vinyl alcohol copolymer film, an ethylene-methacrylate copolymer film, a nylon (registered trademark) film (polyamide film), a polyimide film, and an organic resin film (synthetic resin film) such as cellophane. In addition, in view of ensuring both cushioning performance and strength, it is preferred that, as the resin, film 4, a foamed resin sheet such as a polyethylene foam sheet be used.

Next, the roll-to-roll apparatus for performing predetermined processing on the glass roll 1 configured as described above, and the procedure for processing the glass film 2 by the apparatus are briefly described.

Figure 2:
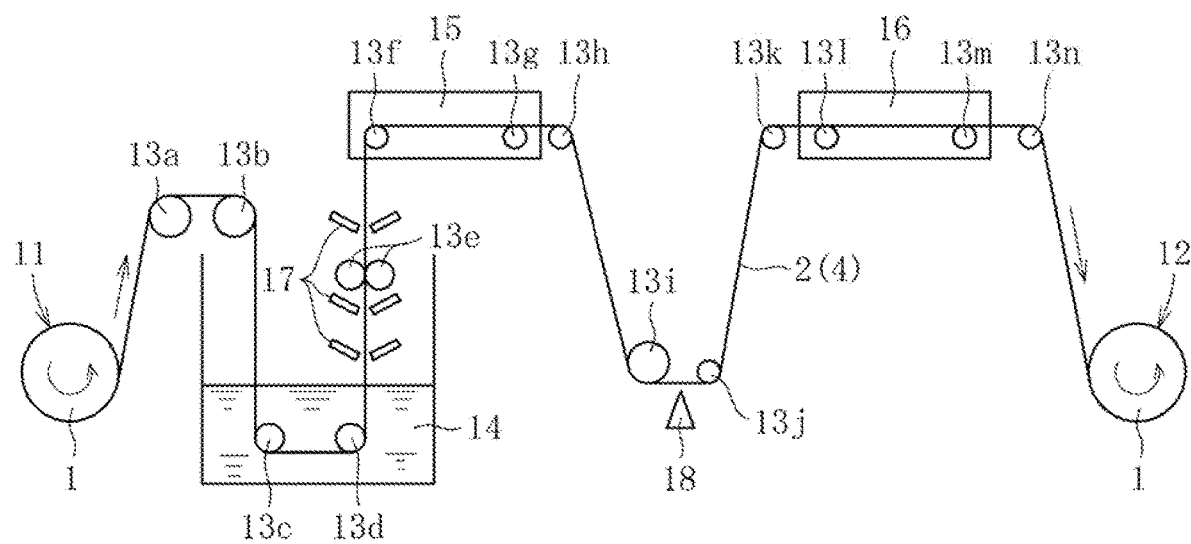
FIG. 2 A schematic view illustrating a roll-to-roll apparatus used for processing the glass roll according to the first embodiment.

FIG. 2 is a schematic view illustrating an example of the roll-to-roll apparatus. The roll-to-roll apparatus includes an unwinding section 11 arranged at an upstream end of a conveyance path, and a winding section 12 arranged at a downstream end of the conveyance path. Between the unwinding section 11 and the winding section 12, the predetermined processing is performed on the glass film 2.

Specifically, after the glass roll 1 is set in the unwinding section 11, the predetermined processing is performed successively while conveying rollers 13a to 13n sequentially convey, to a downstream side, the glass film 2 which is unwound from the glass roll 1 set in the unwinding section 11, and then the glass film 2 subjected to the predetermined processing is sequentially wound in the winding section 12. In this way, the glass roll 1 is produced again.

In this embodiment, on the conveyance path between the unwinding section 11 and the winding section 12, in order from an upstream side of the conveyance path, there are arranged a cleaning chamber 14 which pools cleaning liquid (for example, water), a drying chamber 15 in which the glass film 2 dipped into the cleaning liquid of the cleaning chamber 14 is dried with hot air or the like, and a static elimination chamber 16 in which static electricity accumulated on the glass film 2 is eliminated. In order from the upstream side, a cleaning process, a drying process, and a static elimination process are performed on the glass film 2. Note that, in FIG. 2, reference numeral 17 denotes a draining section, and reference numeral 18 denotes a surface treatment section.

Further, as described above, in order for the roll-to-roll apparatus to perform the predetermined processing such as cleaning on the glass film 2, first, it is necessary to guide the glass film 2 unwound from the glass roll 1 set in the unwinding section 11 into the winding section 12, and to stretch the glass film 2 between the unwinding section 11 and the winding section 12. At this time, when the glass film 2 is guided into an inside of the roll-to-roll apparatus while the leading end portion in the unwinding direction of the glass film 2 is in the lead, the leading end portion of the glass film 2 is excessively and repeatedly brought into contact with/impact on apparatus components of the roll-to-roll apparatus, and hence the glass film 2 may break. In view of this, as illustrated in FIG. 1, the resin film 4 is coupled on the leading end portion of the glass film 2, and the glass film 2 is guided into the inside of the roll-to-roll apparatus while the resin film 4 is in the lead.

That is, the resin film 4 has higher fracture toughness in comparison with the glass film 2. Thus, even when the resin film is brought into contact with the apparatus components to have small flaws, the resin film does not break due to the small flaws. Therefore, when the glass film 2 is guided into the inside of the roll-to-roll apparatus while the resin film 4 is in the lead, it is possible to reliably reduce such a situation that the glass film 2 is flawed due to excessive contact with the apparatus components.

Here, in view of preventing breakage of the glass film 2, it is preferred that a length of the resin film 4 (indicated by D1 of FIG. 3 described below), which corresponds to a part on the front side of the unwinding direction relative to the leading end portion in the unwinding direction of the glass film, be equal to or larger than an entire length of the conveyance path provided in the inside of the roll-to-roll apparatus. With this configuration, only the resin film 4 is present in the inside of the roll-to-roll apparatus at an early stage of operation, and hence it is possible to smoothly perform guiding operation from the unwinding section 11 to the winding section 12 without paying any attention to the breakage of the glass film 2.

Figure 9:
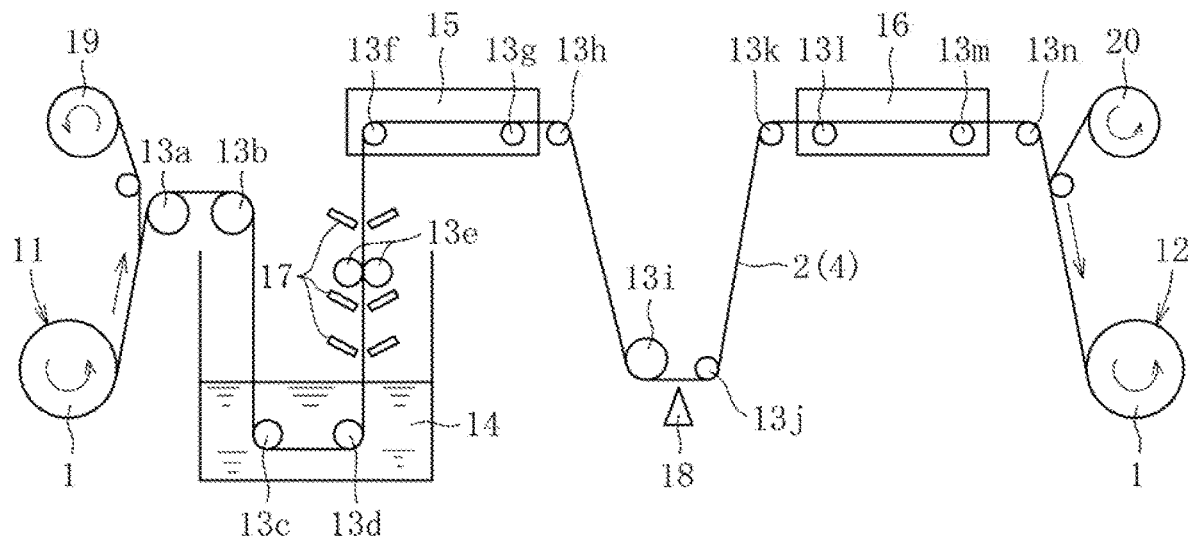
FIG. 9 A schematic view illustrating a roll-to-roll apparatus used for processing the glass roll according to the seventh embodiment.

Note that, in the above-mentioned embodiment, description is made of the case where the glass film 2 is wound around the roll core 3 into a roll, to thereby manufacture the glass roll 1. However, in view of protecting a surface of the glass film 2, it is preferred that, under a state in which the cushion sheet (not shown) is superposed on any one of surfaces of the glass film 2, the glass film 2 and the cushion sheet be wound around the roll core 3 together. In this case, it is preferred that the roll-to-roll apparatus have both such a configuration as to separate the cushion sheet from the glass film 2 before processing, and such a configuration as to superpose the cushion sheet on the glass film 2 and wind the cushion sheet and the glass film again after the processing (for example, see a winding section 19 and an unwinding section 20 for the resin film 4 illustrated in FIG. 9 described below).

Further, in the above-mentioned embodiment, description is made of the case where the glass film 2 and the resin film 4 are coupled to each other by attaching the adhesive tapes 5 across the films. However, the glass film 2 and the resin film 4 may be coupled to each other by bonding the films with an adhesive. In this case, it is preferred that, as the adhesive, one that can separate a bonded portion between the glass film 2 and the resin film 4 again be used.

Further, the glass film 2 and the resin film 4 may be coupled to each other by stretching the adhesive tapes 5 across the end portion of the glass film 2 and the end portion of the resin film 4 under a state in which both of the end portions are abutted on each other without being superposed on each other or under a state in which both of the end portions are opposed to each other with a gap.

Figure 3:
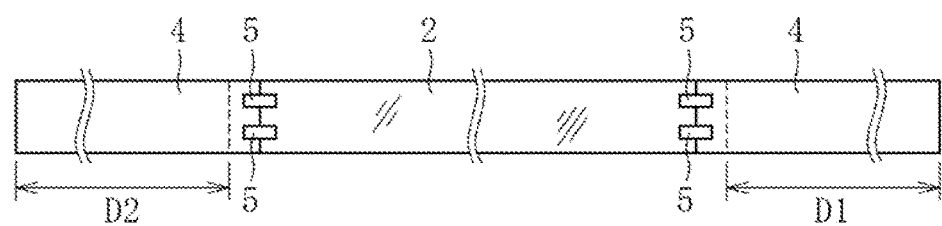
FIG. 3 A plan view illustrating a state in which a glass film of the glass roll according to a second embodiment of the present invention is developed on a straight line.

FIG. 3 is a view illustrating a state in which the glass film of the glass roll according to a second embodiment of the present invention is developed on a straight line. The glass roll 1 according to the second embodiment is different from the glass roll 1 according to the first embodiment in that the resin films 4 are coupled on both of the leading end portion and a trailing end portion in the unwinding direction of the glass film 2, respectively.

The roll-to-roll apparatus needs to keep constant tension between the unwinding section 11 and the winding section 12. When the resin film 4 is coupled on the trailing end portion in the unwinding direction of the glass film 2, the constant tension can act on the glass film 2 through the resin film 4 even after the trailing end portion of the glass film 2 is sent out of the unwinding section 11. Therefore, even after the trailing end portion of the glass film 2 is sent out of the unwinding section 11, it is possible to perform the predetermined processing, such as the above-mentioned cleaning, on the glass film 2. As a result, an unprocessed region included in the glass film 2 is reduced, and hence it is possible to achieve effective use of the glass film 2.

Note that, in view of achieving effective use of the glass film 2, it is preferred that a length D2 of the resin film 4, which corresponds to a part on the rear side of the unwinding direction relative to the trailing end portion in the unwinding direction of the glass film 2, be equal to or larger than the entire length of the conveyance path provided in the inside of the roll-to-roll apparatus. With this configuration, it is possible to stably perform the processing such as the cleaning up to the trailing end portion in the unwinding direction of the glass film 2, and hence it is possible to more reliably achieve effective use of the glass film 2. Note that, at this time, it is more preferred that the length D1 of the resin film 4, which corresponds to the part on the front side of the unwinding direction relative to the leading end portion in the unwinding direction of the glass film 2, be equal to or larger than the entire length of the conveyance path provided in the inside of the roll-to-roll apparatus.

Figure 4A:
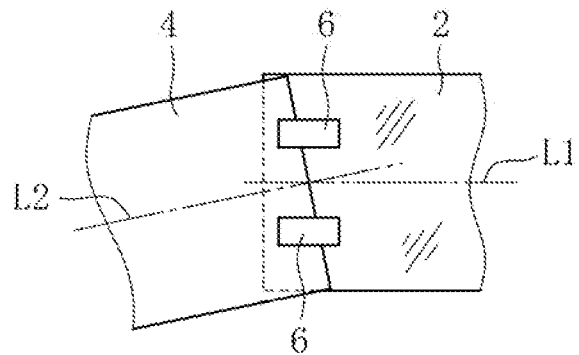
FIG. 4(a) A plan view illustrating a coupled portion between a resin film and the glass film of the glass roll according to a third embodiment of the present invention, and illustrating a state before tension acts on the glass film.
Figure 4B:
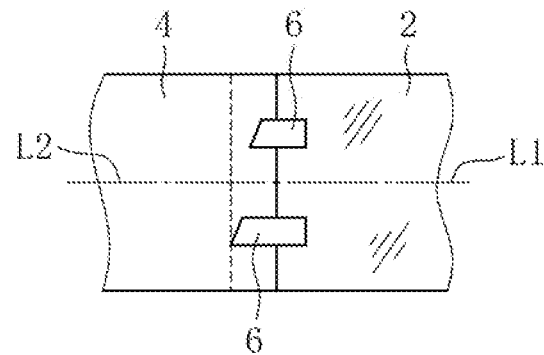
FIG. 4(b) A plan view illustrating the coupled portion between the resin film and the glass film of the glass roll according to the third embodiment of the present invention, and illustrating a state after the tension acts on the glass film.

FIGS. 4(a) and 4(b) are views illustrating a coupled portion between the resin film and the glass film of the glass roll according to a third embodiment of the present invention. The glass roll 1 according to the third embodiment is different from the glass roll 1 according to any one of the first and second embodiments in that the glass film 2 and the resin film 4 are coupled to each other with elastic adhesive tapes 6 as elastic members.

In a case where a widthwise center line L1 of the glass film 2 and a widthwise center line L2 of the resin film 4 are not present on the same straight line, the roll-to-roll apparatus forcibly corrects displacement (inclination) of the glass film 2, and hence bending stress and torsional stress act on the portion of the glass film 2 coupled to the resin film 4. Consequently, there may arise a problem in that the glass film 2 breaks.

In view of this, as illustrated in FIG. 4(a), the glass film 2 and the resin film 4 are coupled to each other with the elastic adhesive tapes 6, and thus the above-mentioned problem is solved. That is, when the glass film 2 and the resin film 4 are coupled to each other with the elastic adhesive tapes 6 as described above, even if the widthwise center line L1 of the glass film 2 and the widthwise center line L2 of the resin film 4 are not present on the same straight line, as illustrated in FIG. 4(b), the elastic adhesive tapes 6 are deformed at the point in time when the tension acts on the glass film 2. Consequently, it is possible to absorb the displacement between the widthwise center line L1 of the glass film 2 and the widthwise center line L2 of the resin film 4.

Specifically, as illustrated in FIG. 4(a), in a case where, under a state in which the widthwise center line L1 of the glass film 2 is inclined with respect to the widthwise center line L2 of the resin film 4, the elastic adhesive tapes 6 are attached on both sides of the widthwise center line L1 of the glass film 2, as illustrated in FIG. 4(b), the elastic adhesive tape 6 on one side of the widthwise center line L1 is expanded, and the elastic adhesive tape 6 on the other side of the widthwise center line L1 is contracted. Owing to the deformation of the elastic adhesive tapes 6, the inclination of the widthwise center line L1 of the glass film 2 is corrected, and the widthwise center line L1 of the glass film 2 and the widthwise center line L2 of the resin film 4 substantially conform to each other on the same straight line. Therefore, the bending stress and the torsional stress are less likely to occur directly on the glass film 2. Thus, even in a case where the widthwise center line L1 of the glass film 2 and the widthwise center line L2 of the resin film 4 are not present on the same straight line, it is possible to reliably prevent such a situation that the glass film 2 breaks.

Note that, in FIG. 4(*a*) and FIG. 4(*b*), description is made of the case where the widthwise center line L1 of the glass film 2 and the widthwise center line L2 of the resin film 4 intersect each other at an angle. However, even in a case where the center line L1 and the center line L2 are parallel to each other, the elastic adhesive tapes 6 are deformed similarly, and hence it is possible to absorb the displacement between the center line L1 and the center line L2.

Further, in a case where the resin film 4 is coupled also to the trailing end portion in the unwinding direction of the glass film 2, it is preferred that the glass film 2 and the resin film 4 be coupled to each other with the elastic adhesive tapes 6 at both of the leading end portion and the trailing end portion in the unwinding direction of the glass film 2.

Note that, examples of the elastic adhesive tape 6 include a tape that has a base member formed of a polyester film. Further, the elastic member that couples the glass film 2 and the resin film 4 to each other is not limited to the elastic adhesive tape 6, but may be an elastic adhesive.

Figure 5A:
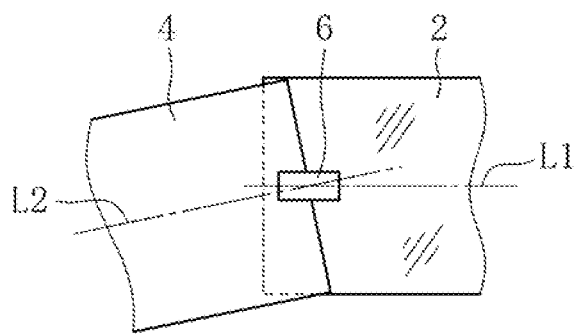
FIG. 5(a) A plan view illustrating a coupled portion between the resin film and the glass film of the glass roll according to a fourth embodiment of the present invention, and illustrating a state before tension acts on the glass film.
Figure 5B:
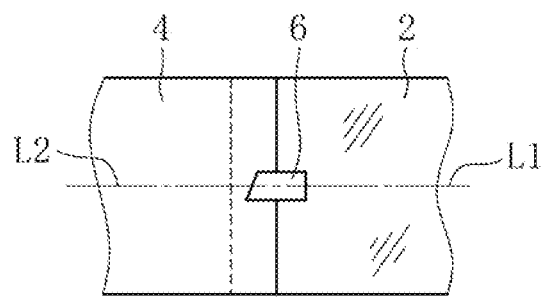
FIG. 5(b) A plan view illustrating the coupled portion between the resin film and the glass film of the glass roll according to the fourth embodiment of the present invention, and illustrating a state after the tension acts on the glass film.

FIGS. 5(*a*) and 5(*b*) are views illustrating a coupled portion between the resin film and the glass film of the glass roll according to a fourth embodiment of the present invention. The glass roll 1 according to the fourth embodiment is different from the glass roll 1 according to the third embodiment in that the elastic adhesive tape 6 as the elastic member couples a region (only one point in the illustrated example) including the widthwise center line L1 of the glass film 2 and the widthwise center line L2 of the resin film 4.

Specifically, a widthwise center of the elastic adhesive tape 6 conforms to the widthwise center line L1 of the glass film 2 and the widthwise center line L2 of the resin film 4. Further, a width of the elastic adhesive tape 6 is smaller than widths of the glass film 2 and the resin film, and an intersection between the widthwise center line L1 of the glass film 2 and the widthwise center line L2 of the resin film 4 is included in a region where the elastic adhesive tape 6 is attached.

With this configuration, the elastic adhesive tape 6 couples a region including the widthwise center line L1 of the glass film 2 to a region including the widthwise center line L2 of the resin film 4, and hence, even if an area of the coupled portion with the elastic adhesive tape 6 is reduced, it is possible to couple the films to each other in stable postures. Accordingly, owing to a reduction in size of the coupled portion, the stress can be reduced as much as possible, which acts on the glass film 2 by the elastic adhesive tape 6 absorbs the displacement between the widthwise center line L1 of the glass film 2 and the widthwise center line L2 of the resin film 4. Therefore, this is effective also in view of preventing breakage of the glass film 2. Further, the elastic adhesive tape 6 is positioned on the widthwise center lines of the glass film 2 and the resin film 4, and hence it is possible to suppress a deformation amount of the elastic adhesive tape 6, which is necessary to absorb the displacement between the widthwise center line L1 of the glass film 2 and the widthwise center line L2 of the resin film 4.

Note that, in FIG. 5(*a*) and FIG. 5(*b*), description is made of the case where the widthwise center line L1 of the glass film 2 and the widthwise center line L2 of the resin film 4 intersect each other at an angle. However, even in a case where the center line L1 and the center line L2 are parallel to each other, the elastic adhesive tape 6 is deformed similarly, and hence it is possible to absorb the displacement between the center line L1 and the center line L2.

Figure 6A:
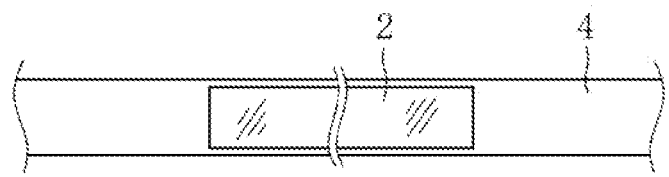
FIG. 6(a) A plan view illustrating a state in which the glass film of the glass roll according to a fifth embodiment of the present invention is developed on a straight line.
Figure 6B:
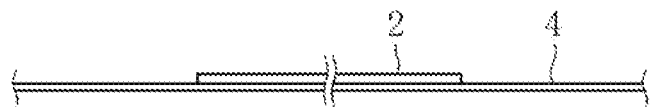
FIG. 6(b) A side view of FIG. 6(a).

FIGS. 6(*a*) and 6(*b*) are views illustrating a state in which the glass film of the glass roll according to a fifth embodiment of the present invention is developed on a straight line. The glass roll 1 according to the fifth embodiment is different from the glass roll 1 according to any one of the first to fourth embodiments in that the glass film 2 is superposed and attached on one resin film 4 longer in length than the glass film 2, and the resin film 4 is extended beyond at least the leading end portion in the unwinding direction of the glass film 2. Note that, in the illustrated example, there is illustrated a state in which the resin film 4 is extended beyond both of the leading end portion and the trailing end portion in the unwinding direction of the glass film 2.

With this configuration, while protecting one surface of the glass film 2 with the resin film 4, the roll-to-roll apparatus can perform the predetermined processing on the other surface of the glass film 2.

In this case, it is preferred that the glass film 2 be peelably bonded onto the resin film 4. In this case, the glass film 2 is attached onto the resin film 4, and hence, even if the glass film 2 breaks, etc., it is possible to prevent such a situation that glass fragments are scattered around. Further, such a situation is less likely to arise that the resin film 4 is cut halfway through the roll-to-roll apparatus due to breakage. Thus, even if such a situation arises that the glass film 2 is cut halfway through the roll-to-roll apparatus due to breakage, the constant tension can act on the glass film 2. Therefore, it is possible to prevent halfway stop of a roll-to-roll step.

Further, an effective surface of the glass film 2, on which an electrode or the like is formed, needs to avoid direct contact with another member as much as possible, and hence it is preferred that the resin film 4 be attached on a surface opposite to the effective surface of the glass film 2.

Figure 7:
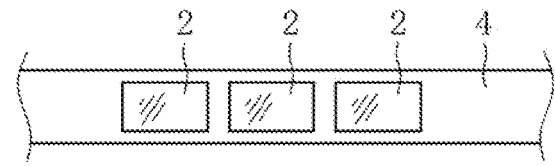
FIG. 7 A plan view illustrating a state in which glass films of the glass roll according to a sixth embodiment of the present invention are developed on a straight line.

FIG. 7 is a view illustrating a state in which glass films of the glass roll according to a sixth embodiment of the present invention are developed on a straight line. The glass roll 1 according to the sixth embodiment is different from the glass roll 1 according to the fifth embodiment in that a plurality of glass films 2 are attached on one resin film 4 with longitudinal intervals.

With this configuration, even the plurality of glass films 2 with short lengths, which are previously cut into fixed lengths, or the plurality of glass films 2 with short lengths, which are cut due to a defect and the like at a stage of not having predetermined lengths, can be packaged in a state of the glass roll 1. Further, by being packaged in the state of the glass roll 1, even the glass films 2 with short lengths can be subjected to the predetermined processing using a roll-to-roll method.

Note that, in this case, sizes (mainly, lengths in a conveying direction) of the glass films 2 to be attached on one resin film 4 are not particularly limited. The glass films 2 may have different sizes.

Figure 8A:
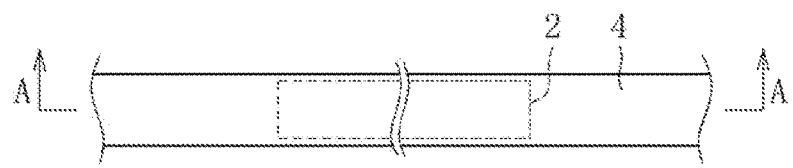
FIG. 8(a) A plan view illustrating a state in which the glass film of the glass roll according to a seventh embodiment of the present invention is developed on a straight line.
Figure 8B:
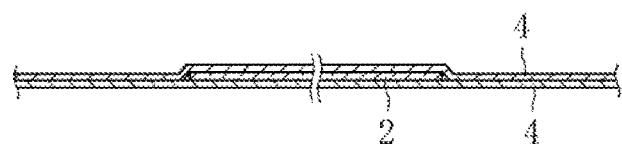
FIG. 8(b) A sectional view taken along the line A-A of FIG. 8(a).

FIGS. 8(*a*) and 8(*b*) are views illustrating a state in which the glass film of the glass roll according to a seventh embodiment of the present invention is developed on a straight line. The glass roll 1 according to the seventh embodiment is different from the glass roll 1 according to any one of the fifth and sixth embodiments in that two resin films 4 are attached so as to sandwich entire front and back surfaces of the glass film 2 from both sides thereof.

With this configuration, it is possible to protect the entire front and back surfaces of the glass film 2 with the resin films 4. Further, just before performing the predetermined processing by the roll-to-roll apparatus, by peeling off the resin film 4 attached on a surface that needs to be subjected to the predetermined processing such as the cleaning, it is possible to carry out the predetermined processing without any problem.

Specifically, the following can be given as an example of the roll-to-roll apparatus used in this case. In addition to the configuration of the roll-to-roll apparatus illustrated in FIG. 2, as illustrated, for example, in FIG. 9, the roll-to-roll apparatus includes: the winding section 19 for winding the resin film 4 attached on one surface of the glass film 2 on the upstream side of the cleaning chamber 14, i.e., in a first processing step, to thereby detach the resin film 4 from the one surface of the glass film 2; and the unwinding section 20 for unwinding the resin film 4 on the downstream side of the static elimination chamber 16, i.e., in a final processing step, to thereby attach the resin film 4 on the one surface of the glass film 2 again.

Note that, in a case of covering the entire front and back surfaces of the glass film 2 with the resin films 4 as described above, it is preferred that the resin film 4 on the effective surface side of the glass film 2 be not jointed to the glass film 2 through bonding or the like. This is because, when the resin film 4 is jointed on the effective surface side through bonding or the like, there is a fear in that foreign matters such as bonding components remain on the effective surface after the resin film 4 is peeled off from the effective surface of the glass film 2. That is, it is preferred that the resin film 4 on the effective surface side of the glass film 2 be jointed through bonding or the like only to the resin film 4 opposite to the effective surface of the glass film 2.

Figure 10A:
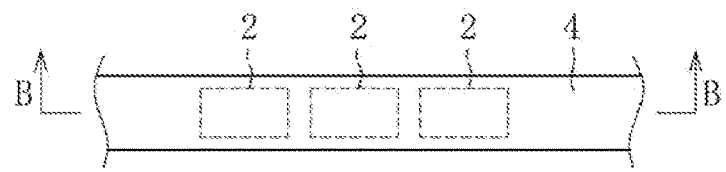
FIG. 10(a) A plan view illustrating a state in which the glass films of the glass roll according to a modified example of the seventh embodiment of the present invention are developed on a straight line.
Figure 10B:
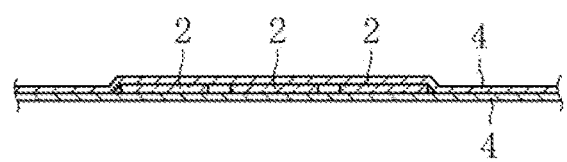
FIG. 10(b) A sectional view taken along the line B-B of FIG. 10(a).

Further, as illustrated in FIGS. 10(a) and 10(b), entire front and back surfaces of the plurality of glass films 2 may be covered with two resin films 4.

Figure 11:
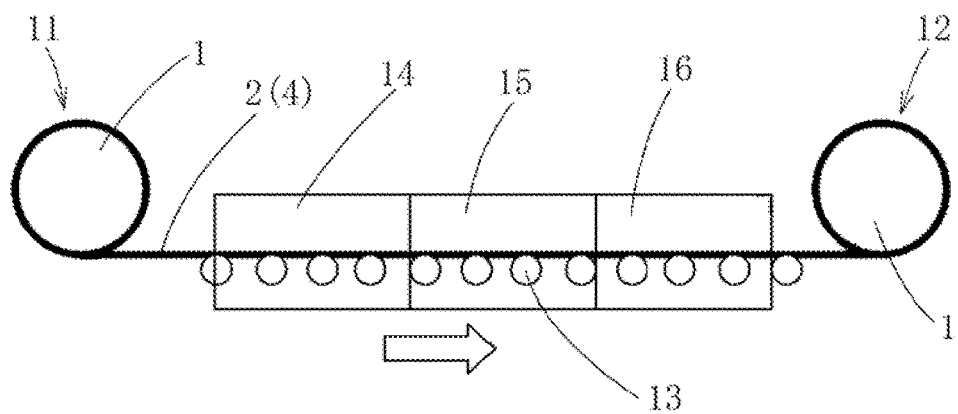
FIG. 11 A schematic view illustrating a modified example of the roll-to-roll apparatus used for processing the glass roll according to the present invention.

Note that, the present invention is not limited to the above-mentioned embodiments, and can be implemented in various modes. For example, in each of the above-mentioned embodiments, using the roll-to-roll apparatus illustrated in FIG. 2 or FIG. 9, the glass film 2 is conveyed in a meandering manner by the conveying rollers 13a to 13n between the unwinding section 11 and the winding section 12. However, as illustrated in FIG. 11, the glass film 2 may be conveyed along a straight line by the conveying rollers 13 between the unwinding section 11 and the winding section 12.

Figure 12:
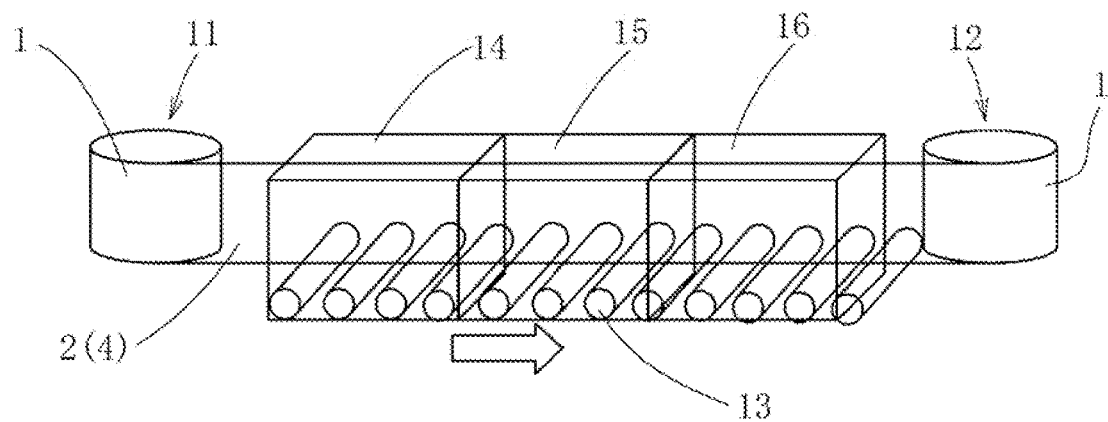
FIG. 12 A schematic view illustrating another modified example of the roll-to-roll apparatus used for processing the glass roll according to the present invention.

Further, as illustrated in FIG. 12, the glass film 2 may be conveyed in an upright state along a straight line between the unwinding section 11 and the winding section 12. When performing the processing using the roll-to-roll method under a state in which the glass film 2 is upright as described above, in a case of providing the cleaning chamber 14 to perform the cleaning process, there is an advantage that the cleaning liquid is drained satisfactorily. Further, the conveying rollers 13 and the surface of the glass film 2 are out of direct contact with each other, and hence it is also possible to reliably prevent such a situation that the surface of the glass film 2 is flawed due to contact with the conveying rollers 13. Note that, in this case, when the glass film 2 flutters, conveying rollers may be added above the glass film 2, and both upper and lower sides of the glass film 2 may be supported by the conveying rollers.

Further, in the above-mentioned embodiments, description is made of the case where the glass film 2 is formed by the overflow downdraw method. However, the glass film 2 may be formed by a downdraw method such as a slot downdraw method or a redraw method. When using the downdraw method in this way, unlike a case of forming the glass film 2 by a float method, the surface of the glass film 2 is not contaminated by tin or the like. Thus, there is an advantage that the glass film 2 can be used under a state in which the surface of the glass film 2 remains unpolished. The glass roll 1 is targeted for the glass film 2 having a small thickness, and hence it is also very advantageous to use the glass film with a surface remaining unpolished in terms of reducing a risk of breakage of the glass film 2. Note that, in view of ensuring smoothness of the surface of the glass film 2, it is preferred to adopt the overflow downdraw method or the redraw method among the downdraw method.

INDUSTRIAL APPLICABILITY

The present invention can be preferably used to a glass substrate used for a flat panel display, such as a liquid crystal display or an OLED display, and for a device such as a solar cell, and used to cover glass for an OLED lighting.

REFERENCE SIGNS LIST 1 glass roll
2 glass film
3 roll core
4 resin film
5 adhesive tape
6 elastic adhesive tape (elastic member)
11 unwinding section
12 winding section
14 cleaning chamber
15 drying chamber
16 static elimination chamber

The invention claimed is:

1. A processing method of sequentially performing predetermined processing by a roll-to-roll apparatus on a glass roll including a glass film wound into a roll, the processing method comprising:
    attaching a resin film onto the glass film such that at least a part of the resin film is in front of a leading end portion of the glass film relative to an unwinding direction of the glass film; and
    guiding the glass film into the roll-to-roll apparatus while the resin film is in the lead;
    wherein a length of the part of the resin film in front of the leading end portion of the glass film relative to the unwinding direction is equal to or larger than an entire length of a conveyance path for the glass film in the roll-to-roll apparatus.

2. The processing method according to claim 1, wherein at least a part of the resin film is arranged also on a rear side of the unwinding direction relative to a trailing end portion in the unwinding direction of the glass film.

3. The processing method according to claim 2, wherein the part of the resin film in front of the leading end portion is a first part, wherein a length of a second part the resin film behind the trailing end portion of the glass film relative to the unwinding direction is equal to or larger than the entire length of the conveyance path for the glass film in the roll-to-roll apparatus.

4. The processing method according to claim 1, wherein the part of the resin film in front of the leading end portion is a first part, wherein at least a second part of the resin film is behind a trailing end portion of the glass film in the unwinding direction of the glass film.

5. A processing method of sequentially performing predetermined processing by a roll-to-roll apparatus on a glass roll including a glass film wound into a roll, the processing method comprising:
- attaching a resin film onto the glass film such that at least a part of the resin film is in front of a leading end portion of the glass film relative to an unwinding direction of the glass film; and
- guiding the glass film into the roll-to-roll apparatus while the resin film is in the lead;
- wherein the glass film is conveyed by conveying rollers through the roll-to-roll apparatus during the processing in a non-linear manner with a plurality of directional changes such that the conveying rollers contact both surfaces of the glass film.

* * * * *